Dec. 8, 1964  F. R. ABBOTT  3,160,769

MAGNETOSTRICTIVE TRANSDUCER

Filed Sept. 26, 1961  2 Sheets-Sheet 1

INVENTOR.
FRANK R. ABBOTT

BY

ATTORNEYS

INVENTOR.
FRANK R. ABBOTT

United States Patent Office 3,160,769
Patented Dec. 8, 1964

3,160,769
MAGNETOSTRICTIVE TRANSDUCER
Frank R. Abbott, San Diego, Calif., assignor to the United States of America as represented by the Secretary of the Navy
Filed Sept. 26, 1961, Ser. No. 140,960
14 Claims. (Cl. 310—26)
(Granted under Title 35, U.S. Code (1952), sec. 266)

The invention described herein may be manufactured and used by or for the Government of the United States of America for governmental purposes without the payment of any royalties thereon or therefor.

This invention relates in general to energy conversion transducers and is in particular a shunted bias magnetostrictive transducer that converts electrical energy into proportional acoustical energy and vice versa, including the low audible frequency range of 100 cycles per second or lower while disposed within an aqueous environmental medium.

In the past, magnetostrictive sound sources requiring an induced residual magnetic field in the magnetostrictive element employed a gap in the loop thereof with a slug of polarized, Alnico or other similar magnetic material disposed therein in such manner that the loop provides a return flux path therefor. An alternating current or intelligence signal winding is then so threaded through the loop that the constant biasing flux and the oscillatory signal flux are superimposed in the closed magnetic loop. However, although this arrangement functions satisfactorily under some circumstances, it is far from ideal because much of the alternating current or intelligence signal leaks around the magnetic slug due to the high reluctivity thereof. In addition, this situation is often aggravated by the existence of an excessive air gap between the magnetostrictive element and the magnetic slug. As a matter of fact, in this type of arrangement, the presence of even the thinnest air gap adversely adds to the reluctance of the A.C. magnetic flux path and degrades the electromechanical coupling performance of the unit. Moreover, the high reluctivity and broad hysteresis loop of the permanent magnet slug renders the penetrating A.C. flux even more ineffective from a fidelity standpoint, and, furthermore, the brittle nature of permanent magnet materials ordinarily precludes the use of thin laminated sheets to reduce dissipative eddy currents.

The instant invention overcomes most of the disadvantages of the aforementioned prior art by eliminating said undesirable air gap and incorporating a unique by-pass structure through which the alternating or intelligence signal flux is directed.

It is, therefore, an object of this invention to provide an improved magnetostrictive transducer.

Another object of this invention is to provide an improved electroacoustical transducer that may be operated underwater with high fidelity at low audible frequencies.

Still another object of this invention is to provide a reversible magnetostrictive transducer having a closed magnetic loop with relatively low reluctivity.

A further object of this invention is to provide a magnetostrictive type electroacoustical transducer that has improved hysteresis characteristics.

Still another object of this invention is to provide a magnetostrictive transducer having low eddy current losses.

Another object of this invention is to provide an underwater electrostrictive transducer having a unique by-pass structure through which alternating or intelligence signal flux is directed rather than an undesirable air gap.

A further object of this invention is to provide a high power magnetostrictive transducer having an improved electroacoustical coupling efficiency.

A still further objective of this invention is to provide a magnetostrictive transducer having considerably reduced inherent internal vibration characteristics.

Another object of this invention is to provide a transducer having low electrical impedance which facilitates the coupling thereof to semiconductor amplifiers, inductive phase compensators, and other low impedance components.

Another object of this invention is to provide a relatively simple magnetostrictive electroacoustical transducer that may be easily and economically constructed and maintained.

With these and other objects in view, as will hereinafter more fully appear, and which will be more particularly pointed out in the appended claims, reference is now made to the following description taken in conjunction with the accompanying drawings in which:

Figure 1:
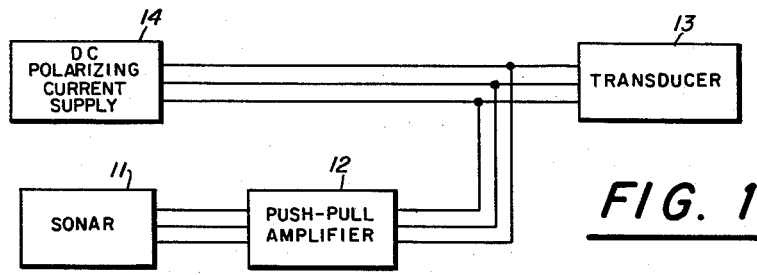
FIG. 1 is a block diagram of an exemplary system in which the subject invention may be incorporated.

Referring now to the drawing, there is shown in FIG. 1 a sonar 11 having its outputs coupled through a push-pull amplifier 12 to the inputs of a transducer 13 of the type constituting this invention. Also, coupled to the inputs of transducer 13 is a direct current polarizing current supply 14, which may be employed, if desired, as a residual polarizing means upon which the intelligence or alternating signal is mixed or superimposed.

Figure 2:
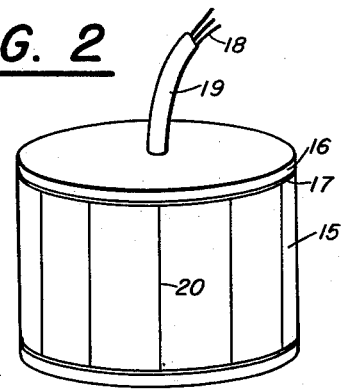
FIG. 2 is a pictorial view of one embodiment of the present invention.

The pictorial view of transducer 13 illustrated in FIG. 2 is shown as being substantially cylindrical in shape. However, it should be understood that any preferred geometrical configuration may be constructed which will best fulfill the requirements of any predetermined operational circumstances, and that so doing would obviously be well within the purview of the artisan in the light of the teachings presented herein.

Transducer 13 includes a flexural cylindrical shaped outer wall or shell 15, consisting of a plurality of arcular segments of magnetostrictive material. Preferably, said shell segments shall be made of Vanadium Permendure, containing 1.8 percent vanadium, 49 percent cobalt, and 49.2 percent iron, but magnetostrictive ferrites or nickel, alpha metal, or any other appropriate magnetostrictive material may be used therefor if so desired. It is made watertight by means of caps 16 secured to the ends of cylindrical shell 15 with any suitable resilient cement 17, such as an epoxy resin cement or the like, inasmuch as it is intended to be operated while submerged within sea water and other aqueous mediums, as will be more fully explained, subsequently.

Electrical leads 18 are likewise disposed in a waterproof cable 19 which extends through one of said end caps 16 by means of any conventional packing gland (not shown) or some other pertinent seal. And, although not shown also, any appropriate hook or other mount structure for supporting the subject transducer at a predetermined location from a ship, aircraft, or submarine by cable or rigid member may be incorporated, too, an operational circumstances warrant. Of course, the aforesaid electrical cable could obviously be used as a support means therefor, if convenient.

Figure 4:
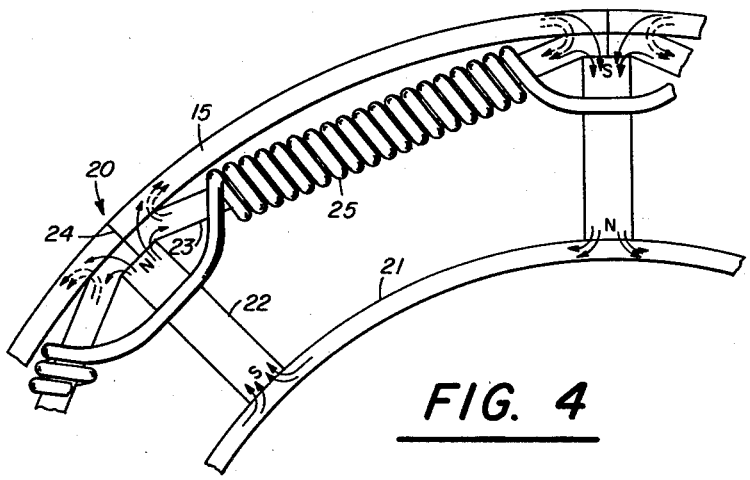
FIG. 4 is an enlarged view of one of the sections of the device of FIG. 3 showing how the alternating current flux is limited to a loop of magnetically high permeability and avoids the lossy, high reluctance path through the magnetic bars.
Figure 3:
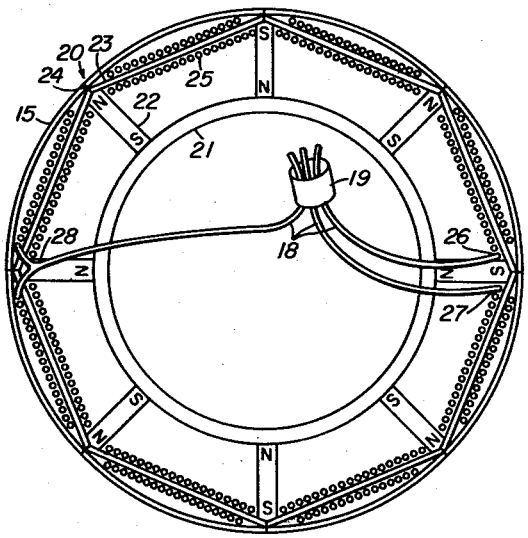
FIG. 3 is a diagrammatical elevational view of the end of the transducer of FIG. 2 with the end cap removed.

Referring now to FIGS. 3 and 4, the exemplary preferred embodiment thereof discloses said flexural wall or shell 15 as a peripheral member which comprises a plurality of arcular segments joined at predetermined hinge joints 20. Concentrically spaced about the longitudinal axis of revolution of said shell is a soft iron inner ring 21 which is also substantially cylindrical in shape and has its longitudinal axis of revolution substantially coinciding with that of said shell. Disposed radially from and attached to the outer surface of ring 21 at positions adjacent the hinge joints of said shell segments are a plurality of strong magnet bars 22 such as Alnico bar magnets or the like. Said magnets are mounted so as to have their poles reversed relative to those of adjacently disposed magnets. Thus, alternate magnets will have their north and south poles effectively mounted on the outer surface of said soft iron ring for magnetic interaction therewith.

Mounted between the outer ends of said magnets and the hinge joints of said shell segments are a plurality of abutting cores 23 having a high permeability. Preferably, cores 23 may be composed of laminations of soft silicon iron which has flux density and magnetomotive response characteristics substantially identical with those of the aforementioned Permendure shell over the intended frequency range. Or, in the alternative, said core members may be made of thin, strong magnetostrictive laminations of 45 Permalloy, if so desired. In any event, for all practical purposes, selection of the materials and physical properties of said core and shell members should be such as reasonably assures linearity of response, for if the A.C. core panels were of lower reluctance than the shell sectors, the Alnico bar magnets would have to be increased in size to provide sufficient bias field in the shell, and, on the other hand, if the reluctance of the core members are much higher than that of the shell sectors, the hysteresis loss of the unit would be adversely increased. Proper selection of said members, however, will provide optimum operational efficiency as well as the most suitable physical dimensions for any given conditions. Here, again, one skilled in the art could obviously make the proper design selection to meet the requirements of any predetermined situation from the teachings herein presented, and hence, so doing should be considered as falling within the purview and scope of this invention.

It should be noted at this time that the aforementioned shells, cores, magnet bars, inner rings, and end caps should have complimentary shapes so as to properly fit together and magnetically interact at their respective joints. Any conventional means of properly fastening and holding all of said elements together as described may be employed, but in the preferred embodiments herein disclosed, a somewhat resilient, yet strong cement 24, such as, for example, an epoxy resin cement, is used to structurally join and hold said elements together as appropriate to form the geometrical configuration illustrated in the drawing.

Disposed around cores 23 is an insulated electrical conductor or wire winding 25 which is wound in opposite directions on the cores of adjacent sectors to effectively direct the alternating flux through the lower reluctance path of the closed magnetic loop when the electrical current representing an intelligence signal is applied thereto. Of course, said winding is connected to the aforesaid electrical leads 18 of electrical cable 19 by connections 26 and 27, and, if a center tap lead is used, it is conducted at connection 28; use of the center tap and its associated lead being optional and at the discretion of the artisan or operator.

Figure 5:
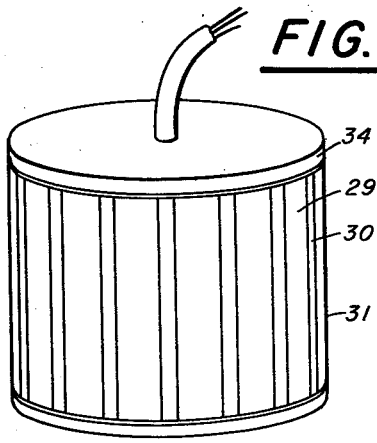
FIG. 5 is a pictorial view of another exemplary embodiment of the instant invention.
Figure 6:
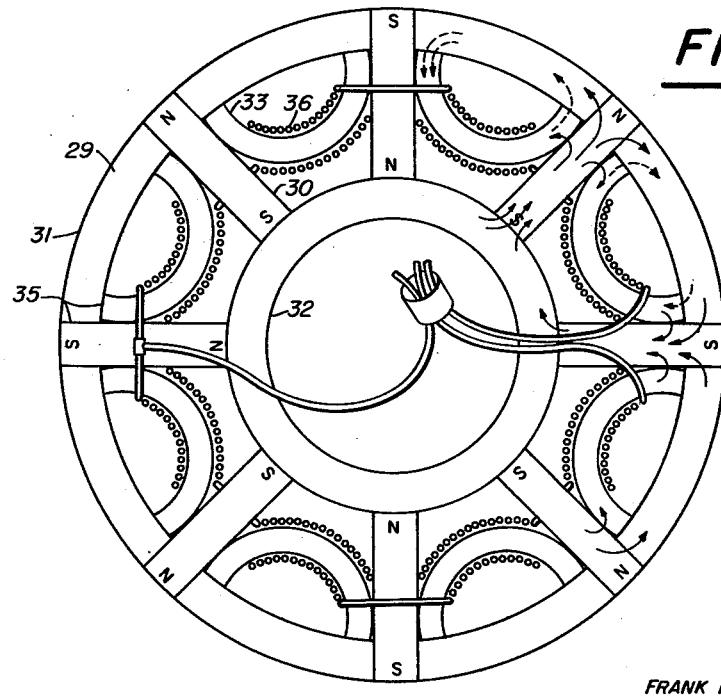
FIG. 6 is a diagrammatical elevational view of the end of another embodiment of the present invention with the end cap removed.

Referring now to FIGS. 5 and 6 there is shown another preferred embodiment of the transducer constituting this invention as having a plurality of substantially circular wall or shell segments 29 of magnetostrictive material, such as, for instance, the aforementioned Permendure or nickel zinc ferrite, which combine with magnetic bars 30 to form a flexural, substantially cylindrical outer surface 31. In this case, however, the ends of said shell segments abut the sides of said magnet bars near their outer extremities instead of at the ends thereof. As previously mentioned, alternate magnetic bars have their poles reversed and their inner ends attached to a soft iron inner ring 32. In each transducer sector formed by two adjacent magnetic bars and its associated shell segment is disposed a curved laminated soft silicon iron A.C. core 33 with the ends thereof abutting the inside surface of the magnetostrictive shell segment. When using nickel zinc ferrite as the material of said shell segments, it has been found that the cross section of the laminated iron core should preferably be only about one-fourth the cross section thereof in order to obtain optimum flux distribution.

Rigid end caps 34 close the ends of shell 29 in such manner as to make the entire transducer unit water tight or adapted for operation within any other environmental medium that otherwise might adversely affect the internal working elements thereof if they were exposed thereto. Said end caps, by their rigidity, preclude flexure which would reduce the response of the cylindrical vanadium permendure panels.

Again, each of the aforementioned members may be joined and held together in any predetermined geometrical configuration by any conventional attachment means. However, if so shaped as to have complementary surfaces at their respective joints, a high strength, somewhat resilient cement 35 such as an epoxy resin, may be satisfactorily employed for this purpose.

As in the devices of FIGS. 2 and 3, an insulated electrical conductor or wire 36 is wound about each core in opposite directions in adjacent sectors and connected to appropriate electrical leads for operation with associated electrical equipment.

Briefly, the operation of the subject invention, as embodied in the devices of FIGS. 2, 3 and 4, as is follows:

An intelligence signal in the form of an electrical current, which may vary in amplitude and frequency in proportion to the information to be conveyed, is applied to leads 18 by any pertinent associated apparatus such as, for instance, sonar 11. When flowing through wire winding 24, said current creates an electromagnetic flux in accordance therewith that is superimposed on the inherent permanent magnetic field, which residually biases the entire structure as a result of the unique combination of elements contained therein.

The aforementioned structural combination is particularly important because it contains two flux paths that the magnetic field generated by magnet bars 22 take, viz., the magnetostrictive shell 15 and the highly permeable core 23, for biasing purposes. Of course, the magnetic circuit is completed by the flux path provided by inner ring 21, which magnetically interacts with the inner ends of magnetic bars 22.

As previously mentioned, the residual magnetic field inherent in the disclosed structural arrangement is modified or modulated by the alternating flux of the intelligence signal, and because it, too, has a complete, low reluctance path through the aforementioned two flux paths comprising soft iron core 23 and magnetostrictive flexural shell 15, it suffers no objectionable hysteresis loss or eddy current power dissipation. For convenience in understanding the flux paths taken by both the residual biasing magnetic flux and the alternating signal magnetic flux, several of the drawing figures include arrows with unbroken and broken tails which represent each thereof, respectively.

Due to the natural magnetostrictive characteristics of Permendure or ferrite materials, the bent sectors of shell 15 tend to change dimension, straighten, and bulge when appropriate magnetic fields are applied thereto. Thus, due to the residual magnetic bias, shell segments 15 take a particular configuration, and when the modulating magnetic field of the intelligence signal is applied, the resulting flexure thereof between the support points located at the relatively fixed joints adjacent the outer ends of magnet bars 22 causes same to act as a sound source because of the compression and decompression of the environmental medium in contact therewith. Actually, the movement of each shell segment creates a varying dilatation of the entire shell, and thereby causes the entire transducer to act as a projector of pressure or acoustical energy.

In some instances, it has been found that the amplitude of motion of the individual shell segments is enhanced by reducing the shell thickness at the fixed support points. This occurs because the shell deformation characteristic then changes from that of the deflection of a continuous beam toward that of simple supported sectors.

The embodiment of the invention represented in FIGS. 5 and 6 functions very similarly to that of FIGS. 2, 3 and 4. However, in event 45 Permalloy is used as the A.C. core panels, they would contract slightly while the shell sectors were expanding and vice versa, since the A.C. flux in these members is opposite in sense while the permanent flux is co-directed. Some distinguishing operational characteristics are effected, though, by this embodiment, in that it ordinarily has a higher resonant frequency and is usually more adaptable to use at extreme water depths and the associated hydrostatic pressures.

The transducers constituting this invention are reversible, i.e., they generate an electrical signal proportional to a received acoustical signal pressure as well as acting as sonic energy generators. This is effected simply because movement of the shell arcs disrupts the residual magnetic field of the entire magnetic circuit and induces an electrical current in winding 24.

Obviously many modifications and variations of the present invention are possible in the light of the foregoing teachings. It is, therefore, to be understood, that within the scope of the appended claims, the invention may be practiced otherwise than as specifically described.

What is claimed is:

1. An electroacoustical transducer comprising in combination, an inner ring, a plurality of permanent magnets effectively attached to said inner ring for magnetic interaction therewith, said magnets extending substantially the entire axial length of said inner ring and radially therefrom with the magnetic poles thereof alternately reversed, a plurality of cores respectively attached to said magnets and bridging the space between adjacent ones thereof, a plurality of electrical windings wound in reverse order about adjacent ones of said plurality of cores, and a plurality of magnetostrictive arcular shell segments effectively connected to each other and the outer extremities of said cores and said magnets at a common joint thereof for magnetic interaction therebetween.

2. The invention according to claim 1 wherein said plurality of permanent magnets effectively attached to said inner ring for magnetic interaction therewith are alnico magnets consisting of a predetermined magnetic combination of aluminum, nickel, and cobalt.

3. The invention according to claim 1 wherein said plurality of magnetostrictive arcular shell segments effectively connected to each other and the outer extremities of said cores and said magnets at a common joint thereof for magnetic interaction therebetween are Permendure shells containing about 1.8 percent vanadium, 49 percent cobalt, and 49.2 percent iron.

4. An electroacoustical transducer comprising in combination, a plurality of adjacently disposed magnetic sectors, each of said sectors having a pair of low reluctance parallel magnetic flux paths and a return magnetic flux path effectively connected in series therewith, one of said paths of said parallel magnetic flux paths comprising an arcular magnetostrictive shell segment and the other thereof consisting of a plurality of soft iron laminations, means coupled between said pair of low reluctance parallel magnetic flux paths and said return magnetic flux path for magnetically biasing each thereof, and means contiguously disposed with each of said plurality of soft iron laminations for superimposing an alternating magnetic field on the aforesaid arcular magnetostrictive shell segment.

5. An electroacoustical transducer comprising in combination, a plurality of adjacently disposed continuous magnetic sectors, each of said sectors having a magnetostrictive flux path at the outer periphery thereof, a soft iron core magnetically connected in parallel with said magnetostrictive flux path, a high permeable return flux path, means connected between said parallel connected magnetostrictive flux path and soft iron core and the aforesaid return flux path for biasing same with a predetermined permanent magnetic field, and means electromagnetically associated with said soft iron core for magnetically modulating said predetermined permanent magnetic field with a magnetic flux proportional to an electrical intelligence signal input thereto, whereby said magnetostrictive flux path changes dimension in accordance therewith.

6. An electroacoustical transducer comprising in combination, a plurality of arcular shaped magnetostrictive shell segments, a plurality of soft iron cores equal in number to said plurality of arcular shaped magnetostrictive shell segments, means connected to each of said shell segments for joining each of said soft iron cores thereto as chords thereof respectively, an inner substantially cylindrical ring having a longitudinal axis of revolution, means for providing a permanent magnetic field disposed about and radially from the outer periphery of said ring, means for connecting said permanent magnetic providing means to said ring at predetermined radial positions, means for connecting the ends of said interconnected shell segments and cores to the outer extremities of said permanent magnetic providing means whereby said shell segments substantially form a cylinder having an axis of revolution substantially coinciding with the axis of revolution of said ring, an insulated electrical conductor wound about each of said soft iron cores, means connecting said electrical conductor windings in series, an end cap cemented to each end of the cylinder formed by said shell segments so as to form a watertight seal therebetween, lead means for supplying electrical current to said series connected conductor windings extending through one of said end caps, and means connected to said end cap and said lead means extending therethrough for likewise providing a watertight seal thereat.

7. An electroacoustical transducer for converting electrical energy into proportional acoustical energy and vice versa while being submerged in a subaqueous medium comprising in combination a substantially cylindrical shell having an external surface adapted for contact with said subaqueous medium, said shell having a plurality of arcular magnetostrictive segments effectively joined at the ends thereof, an inner cylindrical ring concentrically disposed within and in spaced relationship with said shell, an even number of bar magnets having alternately reversed poles uniformly mounted about the outer periphery of said ring and extending to a position adjacent said shell segments for forming a magnetic joint therewith at the aforesaid joined ends thereof respectively, a plurality of core means respectively attached to adjacent ones of said bar magnets and said shell segments at said magnetic joints and bridging the spaces therebetween, insulated electrical conductor means reversely wound on alternate ones of said plurality of core means, means connected to the alternate ones of said electrical conductor means for electrically coupling same in series, end cap means mounted on each end of said shell, cement means respectively interposed between said ring, said bar magnets, said arcular magnetostrictive segments, said core means, and said end cap means for respective attachment thereof as a watertight unitary device, a sealed aperture disposed in one of said end cap means, and electrical lead means attached to said electrical conductor means extending through the sealed aperture of said one end cap means adapted for connection with coactively associated utilization equipment.

8. The invention according to claim 7 wherein the magnetostrictive segments of said substantially cylindrical shell is made of Permendure material composed of about 1.8 percent vanadium, 49 percent cobalt, and 49.2 percent iron.

9. The invention according to claim 7 wherein the magnetostrictive segments of said substantially cylindrical shell is made of a nickel zinc ferrite.

10. The invention according to claim 7 wherein the magnetostrictive segments of said substantially cylindrical shell is made of alpha metal.

11. The invention according to claim 7 wherein said inner cylindrical ring concentrically disposed within and in spaced relationship with said shell is composed of soft silicon iron material.

12. The invention according to claim 7 wherein said bar magnets consist of a predetermined magnetic combination of aluminum, nickel, and cobalt.

13. The invention according to claim 7 wherein the cores of said plurality of core means is composed of a predetermined number of soft silicon iron laminations.

14. The invention according to claim 7 wherein said cement means is composed of an epoxy resin.

References Cited by the Examiner
UNITED STATES PATENTS

| | | | |
|---|---|---|---|
| 2,414,699 | 1/47 | Olsow | 310—26 |
| 2,834,943 | 5/58 | Grisdale | 310—26 |
| 2,853,692 | 9/58 | Wallace | 310—26 |

MILTON O. HIRSHFIELD, *Primary Examiner.*